United States Patent
Thompson et al.

(10) Patent No.: US 7,214,127 B1
(45) Date of Patent: May 8, 2007

(54) BUTCHERING TOOL

(76) Inventors: Timothy L. Thompson, 31 Daughtry Rd., Seminary, MS (US) 39479; Charles T. Thompson, 367 Church St., Petal, MS (US) 39465

(*) Notice: Subject to any disclaimer, the term of this patent is extended or adjusted under 35 U.S.C. 154(b) by 0 days.

(21) Appl. No.: 11/517,514

(22) Filed: Sep. 8, 2006

(51) Int. Cl.
*A22B 5/10* (2006.01)

(52) U.S. Cl. .................................... 452/103

(58) Field of Classification Search ............... 452/2–6, 452/11, 102–105; 182/133–136; 30/164.5, 30/167, 167.1, 168, 169, 171; 294/82.1, 294/86.4, 19, 17, 16, 26, 167; 43/4–6, 15, 43/16, 17.2, 53.5; 81/106, 123; 16/111.1, 16/110.1
See application file for complete search history.

(56) References Cited

U.S. PATENT DOCUMENTS

| | | | |
|---|---|---|---|
| 121,873 A | 12/1871 | Hoffman | |
| 345,630 A | 7/1886 | Girard | |
| 690,174 A * | 12/1901 | Muller | 30/171 |
| 700,617 A * | 5/1902 | Cobaugh | 30/123.7 |
| 824,041 A * | 6/1906 | Pilliner | 157/1.17 |
| 1,096,496 A * | 5/1914 | Dysko | 30/171 |
| 1,465,510 A | 8/1923 | Cote | |
| 1,638,883 A | 8/1927 | Schulz | |
| D152,727 S * | 2/1949 | Peterson | D22/118 |
| 2,630,314 A * | 3/1953 | Cadwallader | 177/129 |
| 3,596,300 A * | 8/1971 | D'Amico | 7/106 |
| 3,846,909 A | 11/1974 | Clarke | |
| 4,654,968 A | 4/1987 | Gatley et al. | |
| 5,845,404 A | 12/1998 | Jeffcoat | |
| 6,921,325 B1 * | 7/2005 | Mace | 452/6 |
| 2002/0104222 A1 | 8/2002 | Jay | |

* cited by examiner

*Primary Examiner*—Thomas Price
(74) *Attorney, Agent, or Firm*—Stephen R. Greiner

(57) ABSTRACT

A butchering tool including a handle and a bar extending from the handle. A claw is affixed to the bar remote from the handle. The claw includes a primary hook curving downwardly and rearwardly toward the bottom of the handle and a notch in the top thereof. The claw also includes a secondary hook that curves upwardly and rearwardly toward the top of the handle and that partially closes the notch.

8 Claims, 2 Drawing Sheets

BUTCHERING TOOL

FIELD OF THE INVENTION

The present invention relates generally to handling, hand and hoist-line implements and, more particularly, to grappling gaffs.

BACKGROUND OF THE INVENTION

Hunting is very popular in the United States, and thousands of people expend significant amounts of time, money, and physical effort in pursuit of game animals. Upon completing a successful hunt, a hunter faces the prospect of having to skin and dress a large animal carcass, often in cold and damp weather and typically after a long and tiring day. While field dressing can be an important part of the hunting experience, for most hunters it is not always the most enjoyable one. The butchering of what may be a heavy and unwieldy animal carcass is, therefore, a task that typically requires excellent tools to minimize work.

A hunter needs a very sharp knife to cut through the hide of an animal carcass. The knife, to be effective for prolonged periods of use, must be kept sharp and free of sticky grime. What is equally important is that the hunter be able to lift, manipulate, and otherwise handle the carcass comfortably and safely as the knife cuts the hide and the meat from bone. It would save time and effort if blade sharpening and carcass manipulating could be achieved through the use of a single tool that is safe and easy to handle even in the presence of slippery blood, animal fat, and ambient dirt. Unfortunately, no tool is presently available that can accomplish these tasks.

SUMMARY OF THE INVENTION

In light of the problems associated with the known butchering tools, it is a principal object of the invention to provide a multi-function, butchering tool that enables the user to grasp, lift and manipulate an animal carcass and that, at the same time, permits the user to sharpen a knife employed to cut the hide and meat off the skeletal framework of the carcass.

It is another object of the invention to provide a simple, sturdy butchering tool of the type described that is readily usable by a hunter or a butcher working alone to efficiently skin and dress an animal carcass under difficult conditions, e.g., while wearing mittens outdoors in bad weather or while working indoors in a frozen meat locker.

It is an additional object of the present invention to provide a butchering tool of the type described that permits a user to field dress a carcass in a manner that minimizes the need to touch the carcass with his hands. Thus, the tool keeps the hands of a user clean and reduces the risk that the hands may become cut while, for example, trying to maintain a handhold on a slippery hide.

It is a further object of the invention to enable a hunter, working alone in cold and wet weather, to quickly and efficiently skin and dress a heavy animal carcass, such as that belonging to an elk or a hog, with a knife that can be repeatedly sharpened and that can be scraped to be kept free of slippery fat and grime that can make holding the knife difficult and dangerous.

It is another object of the invention to provide a butchering tool of the type described that permits a user to easily wipe a knife, used in association therewith, free of fat, tallow, and grime.

It is an object of the invention to provide improved elements and arrangements thereof in a butchering tool for the purposes described that is lightweight in construction, inexpensive to manufacture, and fully dependable in use.

Briefly, the tool in accordance with this invention achieves the intended objects by featuring a handle and a bar extending from the handle. A claw is affixed to the bar remote from the handle. The claw has a primary hook that curves downwardly and rearwardly toward the bottom of the handle. The primary hook has a notch therein that forms a secondary hook. The secondary hook curves upwardly and rearwardly toward the top of the handle. A knife sharpener is releasably secured to the bar. The knife sharpener has a tubular body that can slide over the claw, onto the bar, and into abutment with the handle. At least one abrasive plate is affixed to the tubular body.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENTS

Figure 1:
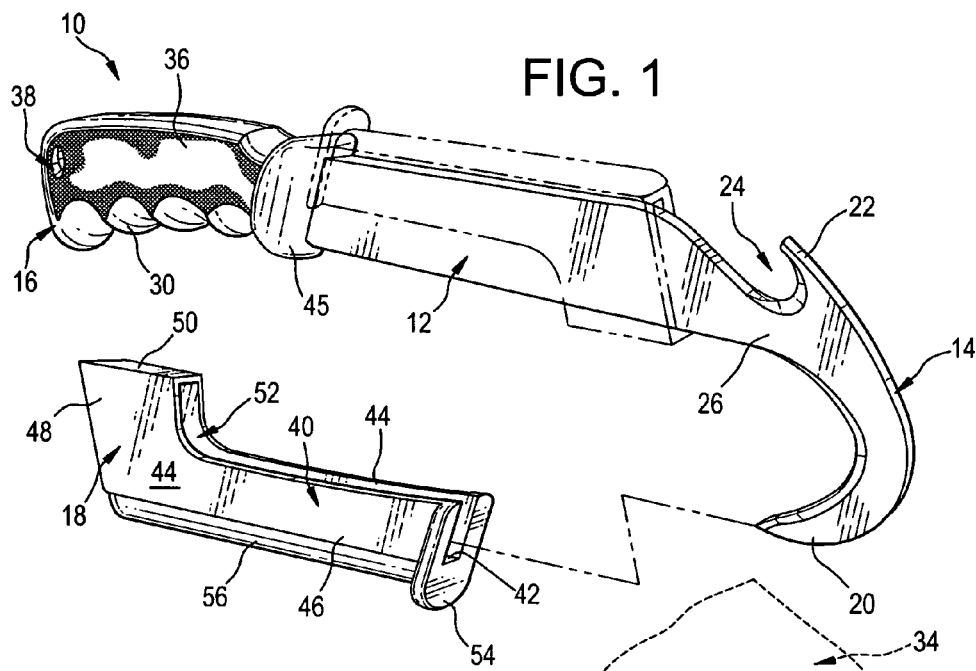
FIG. 1 is an exploded perspective view of a butchering tool in accordance with the present invention.
Figure 2:
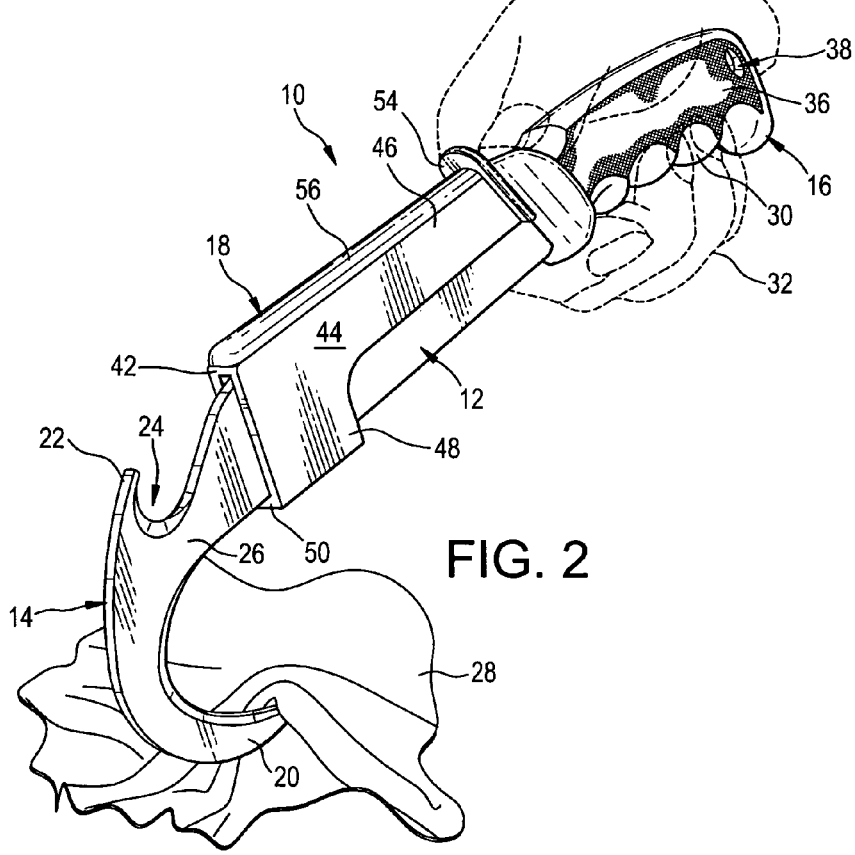
FIG. 2 is a perspective view of the butchering tool of FIG. 1.

Referring now to FIGS. 1 and 2, a butchering tool in accordance with the present invention is shown at 10. Tool 10 includes an elongated bar 12 having a front end to which is affixed a claw 14. A handle 16 is affixed to the rear end of bar 12 remote from claw 14. Selectively carried upon bar 12, between claw 14 and handle 16, is a knife sharpener 18.

Bar 12 is formed of metal and has dimensions adequate to ensure its stiffness during use as a hand tool applying the moderate pushing and pulling forces usual during butchering. The length, width, and height of bar 12 are, therefore, largely a matter of design choice. Nonetheless, it is anticipated that the length of bar 12 will be several times its height to best accommodate sharpener 18.

Claw 14 extends from the front end of bar 12 and is integrally formed therewith. As shown, claw 14 has a primary hook 20 that curves downwardly and rearwardly toward the bottom of handle 16. Claw 14 also has a secondary hook 22 that curves upwardly and rearwardly toward the top of handle 16.

Secondary hook 22 is formed by making a notch 24 in the top of primary hook 20 proximate the junction of bar 12 and primary hook 20. Notch 24 trends forwardly and downwardly into primary hook 20. Notch 24 provides bar 12 with a narrowed neck 26 for connection to primary hook 20. Neck 26 sheds both grime and fat that tend to accumulate on bar 12 during the normal use of tool 10 by a butcher.

Primary hook 20 has a length that is about twice that of secondary hook 22. The larger, primary hook 20 is particularly well adapted for grasping and pulling the hide 28 of an animal carcass during skinning. The smaller, secondary hook 22 is better suited to manipulating the internal organs and muscle tissue of an animal carcass without perforating or tearing them during gutting. Primary and secondary hooks 20 and 22 commonly share a smooth, non-undulating, arcuate, ovoid, front edge for easy insertion into, and removal from, an animal carcass.

Handle 16 is formed of plastic and is molded around the rear end of bar 12. The bottom of handle 16 includes a series of projections 30 that are longitudinally spaced to separate the fingers 32 of a hand 34 for comfort. Adjacent projections 30, the top of handle 16 is provided with a textured, non-slip surface 36 that engages the fingertips and palm of hand 34 for a firm grasp upon handle 16 in all circumstances of the use. A hole 38 through the rear end of handle 16 permits tool 10 to be tied to a lanyard (not shown) so that tool 10 can be suspended by the lanyard from a support in an out-of-the-way place when tool 10 is not in use. A peripheral flange 45 projects outwardly from the front of handle 16 to protect fingers 32 during sharpening and cutting operations.

Knife sharpener 18 includes a tubular body 40 that can be slid over claw 14, onto bar 12, and into abutment with handle 16. Tubular body 40 is provided with a cross section resembling an inverted "U" and a top wall 42 to the opposite sides of which two side walls 44 are affixed and extend downwardly. Each of side walls 44 is L-shaped with a horizontal leg 46 that extends along the length of top wall 42 and a vertical leg 48 that extends downwardly from the front of horizontal leg 46. A bottom wall 50 connects the bottoms of vertical legs 48 to one another and, together with walls 42 and 44, defines a longitudinal passageway 52 through the front of body 40 for snugly receiving claw 14 and bar 12.

Making side walls 44 L-shaped provides benefits to a user. First, such a configuration shortens passageway 52 so that claw 14 can be easily drawn through it. More importantly, however, the L-shape leaves the bottom of bar 12 adjacent handle 16 clear when sharpener 18 is deployed so that this portion of bar 12 can be used as a scraper to wipe a knife blade clean of grease and grime.

A rear wall 54, resembling an inverted "U", is affixed to both the rear end of top wall 42 and the rear ends of horizontal legs 46. Rear wall 54 extends upwardly from top wall 42 and laterally outwardly from horizontal legs 46. Rear wall 54 serves as a gauntlet to prevent a knife engaged with sharpener 18 from approaching handle 16 and injuring hand 34 gripping handle 16.

An abrasive plate 56 is affixed atop top wall 42. Plate 56 is made of textured steel or ceramic or is embedded with diamond dust or a similar material that is capable of the finely abrading and, thus, sharpening the cutting edge of a knife blade rubbed along the length of plate 56. Plate 56 extends the length of top wall 42 and is sized and positioned to permit a user to run a knife blade along its length without catching on any other part of tool 10. A user need only draw a dull cutting edge of a knife along the length of plate 56 to sharpen a knife.

Figure 3:
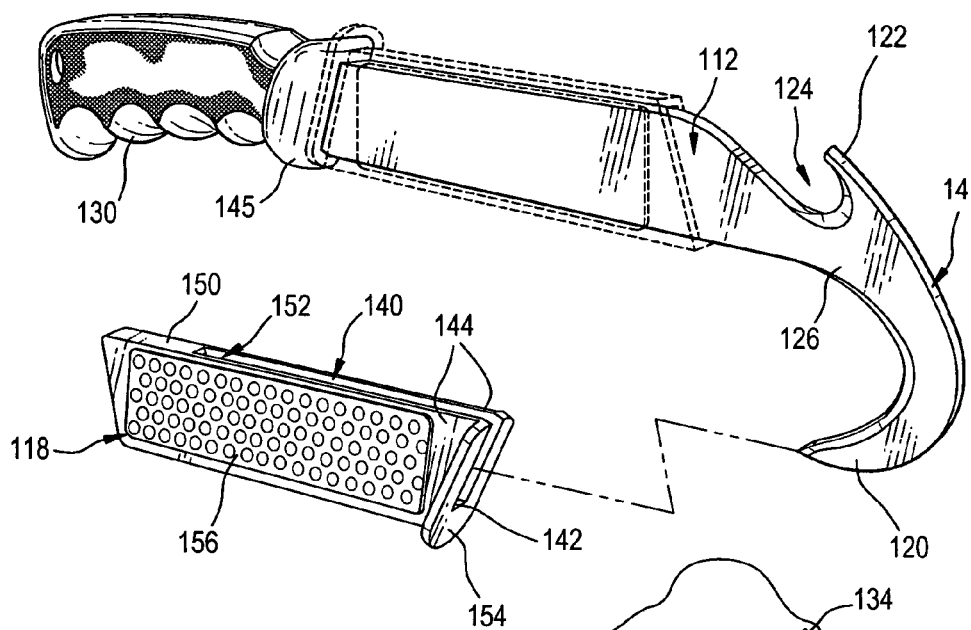
FIG. 3 is an exploded perspective view of an alternative butchering tool in accordance with the present invention.
Figure 4:
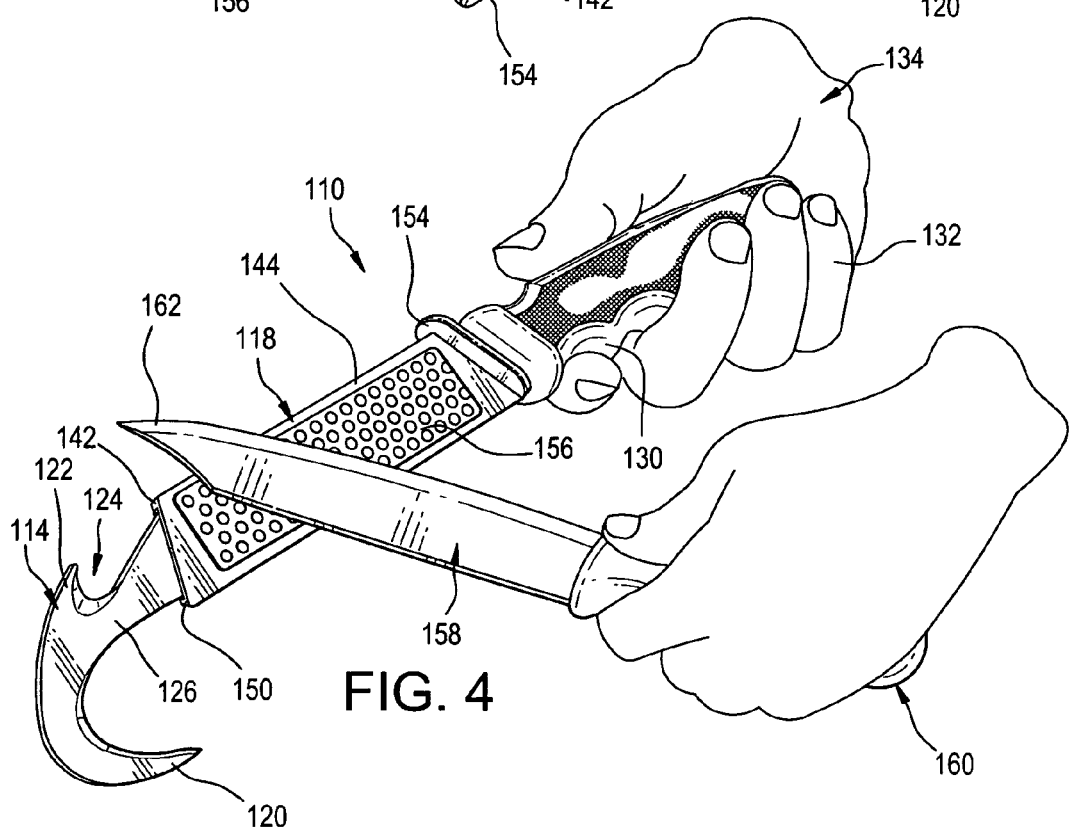
FIG. 4 is a perspective view of the butchering tool of FIG. 3.

Referring now to FIGS. 3 and 4, an alternative butchering tool in accordance with the present invention is shown at 110. Tool 110 is substantially similar to tool 10, differing only in the construction of its knife sharpener 118 which is, perhaps, better suited to conditions of use where minimal grease and grime are present. As such, the description of the features common to both of tools 110 and 10 will not be belabored. Nonetheless, the differences in features will be specified in detail below.

Tool 110 includes an elongated bar 112 having a claw 114 at its front end and a handle 116 at its rear end. Carried on bar 112, between claw 114 and handle 116, is knife sharpener 118.

Claw 114 has a primary hook 120 that curves downwardly and rearwardly toward the bottom of handle 116. Claw 114 also has a secondary hook 122 that curves upwardly and rearwardly toward the top of handle 116.

Making a notch 124 in the top of primary hook 120 forms secondary hook 122. Notch 124 trends forwardly and downwardly through bar 112 and into primary hook 120. Notch 124 provides bar 112 with a narrowed neck 126 connecting to primary hook 120.

The bottom of handle 116 includes longitudinally spaced projections 130 that separate the fingers 132 of a hand 134 for comfort. The top of handle 116, however, is provided with a textured, non-slip surface 136. A hole 138 passes through the rear end of handle 116. A peripheral flange 145 projects outwardly from the front end of handle 16.

Knife sharpener 118 includes a tubular body 140 that can be slid over claw 114, onto bar 112, and into abutment with handle 116. Body 140 has a top wall 142 to the opposite sides of which two side walls 144 are affixed and extend downwardly to form an inverted "U". Each of side walls 144 is trapezoidal with the top thereof being somewhat shorter than the bottom thereof. A bottom wall 150 connects the bottoms of side walls 144 at their respective front ends to define a longitudinal passageway 152 through the front of body 140 configured to snugly receive claw 114 and bar 112.

Making side walls 144 trapezoidal provides benefits. First, such a configuration allows the blade 158 of knife 160 to be drawn at slight angle along the full length of abrasive plates 156 for optimum sharpening. Additionally, the trapezoidal shape aids in guiding claw 114 through passageway 152.

A rear wall 154, resembling an inverted "U", is affixed to both the rear end of top wall 142 and the rear ends of side walls 144. Rear wall 154 extends upwardly from top wall 142 and outwardly from side walls 144.

One of a pair of abrasive plates 156 is affixed to each one of side walls 144. Each of plates 156 is made of roughened steel or ceramic or is embedded with diamond dust or a similar material that is capable of sharpening knife 160. Each plate 156 extends substantially the entire length and height of the side wall 144 to which it is affixed. A user need only draw a dull cutting edge 162 of knife blade 158 along the length of a plate 156 to sharpen blade 158.

Tools 110 and 10 are set-up in a straightforward and substantially identical manner. So, first, with reference to FIG. 3 and tool 110 wherein sharpener 118 is remote from bar 112, a user first inverts sharpener 118 and slides claw 114 through passageway 152. As sharpener 118 is pushed around claw 114, sharpener 118 rights itself. When rear wall 154 comes to engage flange 145 of handle 116, sharpener 118 is properly positioned upon bar 112. With sharpener 118 in place, sharpening and butchering can begin.

Sharpening is easily accomplished and can be repeatedly performed while butchering a large game animal. As illustrated in FIG. 4, the dull cutting edge 162 of knife 160 is drawn across one or both of plates 156 a desired number of times to develop a razor-like quality. Sharpening with tool 10 is performed in the same manner except that cutting edge 162 is drawn solely across the top of sharpener 18 and plate 56.

As shown in FIG. 2, butchering can involve the positioning of a claw 14 partially or fully beneath the hide 28 of an animal carcass. By manipulating handle 16, the user turns claw 14 so that hook 20 twists and securely engages hide 28. Next, the user pulls hide 28 outwardly and cuts hide 28 away from the carcass. If the user's knife becomes laden with tallow, fat, grime or other matter, the user simply runs the blade over the bottom of bar 12 to clean such. (This may be done even while hook 20 is engaged with hide 28.) A user of tool 10 never needs to pull and tug on a cold, damp, and slippery hide 28 with his bare hands again.

Once hide 28 has been detached from the carcass, the user proceeds to strip the meat from the underlying bones. By catching hook 20 on the back strap, tenderloins, front shoulder, and heavy quarters, a user need not hold or lift slippery meat with his bare hands while cutting. Secondary hook 22 is deployed to remove the entrails from an animal carcass. Accumulated fat and grime can be removed from a knife blade by drawing such across the bottom of bar 12. While using a knife in one hand and tool 10 in the other, the time required to skin and dress an animal carcass is greatly reduced.

When tool 10 is no longer being used, sharpener 18 is detached from bar 12 and tool 10 is washed in soap and water. After drying, tool 10 is stored in an out-of-the-way place like a tool box, vehicle trunk, or drawer. Tool 10 is ready for immediate reuse.

While the butchering tools 10 and 110 have been described with a high degree of particularity, it will be appreciated by those skilled in the art that modifications can be made to them. Therefore, it is to be understood that the present invention is not limited to the pair of embodiments described above, but encompasses any and all embodiments within the scope of the following claims.

We claim:

1. A butchering tool, comprising:
   a handle;
   a bar extending from said handle; and,
   a claw being affixed to said bar remote from said handle, said claw including:
      a primary hook curving downwardly and rearwardly toward the bottom of said handle, said primary hook having a notch therein; and,
      a secondary hook curving upwardly and rearwardly toward the top of said handle and partially closing said notch.

2. The butchering tool according to claim 1 wherein said primary hook is about twice as long as said secondary hook.

3. The butchering tool according to claim 1 wherein said handle includes a row or downward projections for positioning between the fingers of a user's hand.

4. The butchering tool according to claim 1 further comprising a knife sharpener releasably secured to said bar.

5. The butchering tool according to claim 4 wherein said knife sharpener comprises:
   a tubular body adapted for sliding over said claw and onto said bar and into abutment with said handle; and,
   an abrasive plate being affixed to said tubular body.

6. The butchering tool according to claim 5 wherein said abrasive plate is affixed to the top of said tubular body.

7. The butchering tool according to claim 5 wherein said abrasive plate is affixed to the side of said tubular body.

8. A butchering tool, comprising:
   a handle;
   a bar extending from said handle;
   a claw being affixed to said bar remote from said handle, said claw including:
      a primary hook curving downwardly and rearwardly toward the bottom of said handle, said primary hook having a notch therein; and,
      a secondary hook curving upwardly and rearwardly toward the top of said handle and defining the configuration of said notch; and,
   a knife sharpener being releasably secured to said bar, said knife sharpener including:
      a tubular body being adapted to slide over said claw and onto said bar and into abutment with said handle; and,
      an abrasive plate being affixed to said tubular body.

* * * * *